United States Patent [19]
Frazee

[11] 3,914,556
[45] Oct. 21, 1975

[54] ON-HOOK AND OFF-HOOK DETECTOR FOR TELEPHONE SWITCHING SYSTEMS

[75] Inventor: Foster Wayne Frazee, Pompton Lakes, N.J.

[73] Assignee: International Telephone and Telegraph Corporation, Nutley, N.J.

[22] Filed: June 12, 1974

[21] Appl. No.: 478,676

[52] U.S. Cl. .............................................. 179/18 F
[51] Int. Cl. .............................................. H04m 3/22
[58] Field of Search ........... 179/18 F, 18 FA, 84 R, 179/84 A, 99, 81 R, 18 FC

[56] References Cited

UNITED STATES PATENTS 3,622,709 11/1971 Jaden .............................. 179/18 F

FOREIGN PATENTS OR APPLICATIONS 1,201,093 8/1970 United Kingdom ........... 179/18 FA

*Primary Examiner*—Thomas A. Robinson
*Attorney, Agent, or Firm*—John T. O'Halloran; Menotti J. Lombardi, Jr.; Alfred C. Hill

[57] ABSTRACT

There is disclosed herein a differential on-hook and off-hook detector for telephone switching systems using common battery signalling. A differential amplifier is coupled by two time constant circuits, each having a different time constant, to the subscriber line. The two time constant circuits and the differential amplifier cooperate to produce a positive output voltage when the resistance of the subscriber line changes from a first resistance (on-hook resistance) to a second resistance (off-hook resistance) and to produce a negative output voltage when the resistance of the subscriber line changes from the second resistance to the first resistance. A first circuit including a light emitting diode and a photo transistor is coupled to the output of the differential amplifier and is responsive to the positive output voltage to provide a binary "O" output signal when the hook switch changes from the on-hook state to the off-hook state. A second circuit including a light emitting diode and a photo transistor is coupled to the output of the differential amplifier to provide a binary "O" output when the hook switch changes from the off-hook state to the on-hook state.

9 Claims, 1 Drawing Figure

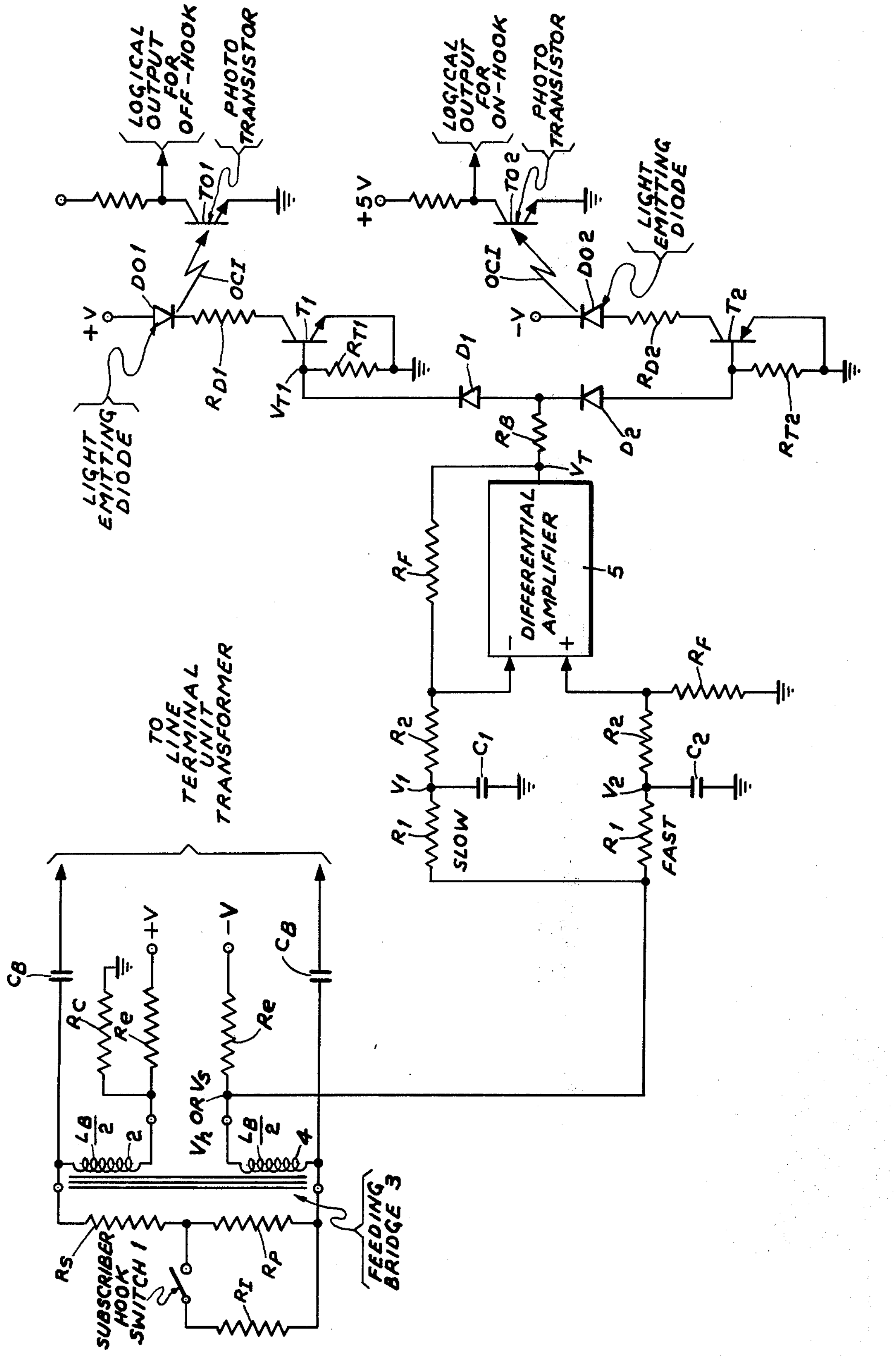
LOGICAL OUTPUT FOR OFF-HOOK
PHOTO TRANSISTOR
LOGICAL OUTPUT FOR ON-HOOK
PHOTO TRANSISTOR
LIGHT EMITTING DIODE
LIGHT EMITTING DIODE
DIFFERENTIAL AMPLIFIER
SLOW
FAST
TO LINE TERMINAL UNIT TRANSFORMER
SUBSCRIBER HOOK SWITCH 1
FEEDING BRIDGE 3
+5V
+V
-V

ON-HOOK AND OFF-HOOK DETECTOR FOR TELEPHONE SWITCHING SYSTEMS

BACKGROUND OF THE INVENTION

This invention relates to telephone switching systems using common battery signalling and more particularly to an on-hook and off-hook detector for employment in such systems.

Presently employed on-hook and off-hook detectors for telephone switching systems using common battery signalling use a circuit to sense the resistance of the subscriber's line. This prior art circuit operates such that when the line resistance exceeds a fixed threshold, on-hook resistance, an on-hook indication is generated, while when the line resistance is less than a fixed threshold, off-hook resistance, an off-hook indication is generated.

As the subscriber line becomes longer and longer, the on-hook resistance becomes less than the on-hook threshold and the off-hook resistance becomes greater than the off-hook threshold. Under these conditions, no indications can be generated and the switch system fails to function properly. Environmental conditions will aggravate the operation of the detector. Since the length of the subscriber line and the operating environmental condition can vary tremendously, the prior art detector cannot reliably detect a change in the hook switch under all conditions and cannot be used by the automatic switching system to indicate when a subscriber wants service, has answered a call or has terminated a call.

SUMMARY OF THE INVENTION

An object of the present invention is to provide an on-hook and off-hook detector for telephone switching systems using common battery signalling which overcomes the disadvantage of the above-mentioned prior art detectors.

Another object of this invention is to provide a differential on-hook and off-hook detector for telephone switching systems using common battery signalling which is especially adaptable to long field wire line applications.

Still another object of this invention is to provide a differential on-hook and off-hook detector for telephone switching systems using common battery signalling which adjusts to all line conditions in less than a second and operates on a sudden change in the line resistance only.

A feature of the present invention is the provision of a differential on-hook and off-hook detector for telephone switching systems using common battery signalling comprising: a subscriber hook switch; a battery having first and second terminals; a subscriber line coupled to the battery and the hook switch, the line having a first resistance when the hook switch is in an on-hook state and a second resistance when the hook switch is in an off-hook state; a first time constant circuit coupled to the line, the first time constant circuit having a first time constant; a second time constant circuit coupled to the line, the second time constant circuit having a second time constant less than the first time constant; a differential amplifier having an output, a negative input coupled to the first time constant circuit and a positive input coupled to the second time constant circuit; the first and second time constant circuits and the differential amplifier cooperating to produce a positive output voltage when the resistance of the line changes from the first resistance to the second resistance and to produce a negative output voltage when the resistance of the line changes from the second resistance to the first resistance; first means coupled to the output of the differential amplifier responsive to the positive output voltage to provide a first output signal when the hook switch changes from the on-hook state to the off-hook state; and second means coupled to the output of the differential amplifier responsive to the negative output voltage to provide a second output signal when the hook switch changes from the off-hook state to the on-hook state.

BRIEF DESCRIPTION OF THE DRAWING

The above-mentioned and other features and objects of this invention and the manner of obtaining them will become more apparent by reference to the following disclosure taken in conjunction with the drawing, the single FIGURE of which is a schematic diagram of an on-hook and off-hook detector in accordance with the principles of the present invention.

DESCRIPTION OF THE PREFERRED EMBODIMENT

The differential on-hook and off-hook detector illustrated in the drawing adjusts to all line conditions in less than a second and operates on a sudden change in the line resistance only. Hence, this detector can be used to provide a reliable indication to an automatic switching system that a subscriber wants service, has answered a call or has terminated a call.

The detector illustrated in the drawing will not react to very rapid pulses or surges caused by lightning and radiation due to the time constant circuit including capacitor $C_2$.

There is presented hereinbelow a list of design formulas that are useful in determining the values of the various electrical components illustrated in the drawing and also useful in explaining the operation of the on-hook and off-hook detector of the present invention.

DESIGN FORMULAS $L_B$ = feeding bridge inductance
$C_B$ = feeding bridge capacitance
$R_s$ = series line resistance
$R_p$ = line leakage resistance
$R_l$ = phone resistance
$t$ = time
$R_{L1}$ = on-hook state = ½ $(R_s + R_p)$
$R_{L2}$ = off-hook state = ½

$$\left[R_s + \frac{R_p R_l}{R_p + R_l}\right]$$

$R_c = \frac{1}{2}(R_1 + R_2)$

LINE RESPONSE — DETECTOR INPUT VOLTAGE $$V_s(t) = \frac{-V}{\left(1 + \frac{R_c}{R_c} + \frac{R_c}{R_{L2}}\right)} \left\{1 - \left[1 - \frac{a^{L}B}{2R_{L2}}\left(1 - \frac{p^{R}e}{-V}\right)\right] e^{-at}\right\}$$

$e^{-at}$ = exponential $$a = \frac{2}{L_B}\left(R_{L2} + \frac{R_e R_e}{R_e + R_e}\right) = \text{reciprocal of line time constant}$$

$$p = \frac{-V}{R_{L1}\left(1 + \frac{R_e)}{R_e}\right. + R_e} = \text{current in inductor at } t = 0$$

$V_h = p\, R_{L1}$ = detector input voltage at $t = 0$

DETECTOR RESPONSE

Detector Response $$V_1(t) = \frac{R_2}{R_1 + R_2}[V_s(t) - (V_s(t) - V_h)e^{-a_1 t}] = \text{slow RC response}$$

$$a_1 = \frac{1}{C_1}\left(\frac{1}{R_1} + \frac{1}{R_2}\right) = \text{reciprocal of detector slow time constant}$$

$$V_2(t) = \frac{R_2}{R_1 + R_2}[V_s(t) - (V_s(t) - V_h)\, e^{-a_2 t}] = \text{fast RC response}$$

$$a_2 = \frac{1}{C_2}\left(\frac{1}{R_1} + \frac{1}{R_2}\right) = \text{reciprocal of detector fast time constant}$$

$$V_{T1}(t) = \frac{R_{T1}}{R_{T1} + R_B}\left[\frac{R_F}{R_2}(V_1(t) - V_2(t) - V_{D1}\right]$$

$$V_{T2}(t) = \frac{R_{T2}}{R_{T2} + R_B}\left[\frac{R_F}{R_2}(V_2(t) - V_1(t)) - V_{D2}\right]$$

With $T_1$ ON $\quad I_{D01} = \dfrac{+V - V_{D01} - V_{T1}}{R_{D1}}$ $I_{T01} = I_{D01}$ X CTR With $T_2$ ON $\quad I_{D02} = \dfrac{-V - V_{D02} - V_{T2}}{R_{D2}}$ $I_{T01} = I_{D02}$X CTR CTR = current transfer ratio of optical coupler isolator OCI = optical coupler isolator The operation of the on-hook and off-hook detector of the present invention will now be described.

I. ON-HOOK TO OFF-HOOK STATE

A. Initial conditions (on-hook state, $t = 0$)

In this condition subscriber hook switch 1 is open and a steady state current, $p$, flows from terminal +V through resistor $R_e$, inductor 2 of feeding bridge 3, the subscriber line including resistors $R_s$ and $R_p$, inductor 4 of feeding bridge 3 and resistor $R_e$ to terminal −V. Thus, the steady state current, p, flows through the line on-hook resistance developing a voltage input $V_h$ to the detector including a first time constant circuit incorporating capacitor $C_1$, a second time constant circuit including capacitor $C_2$ and differential amplifier 5, whose output is coupled to two circuits, one circuit to provide an indication for an off-hook condition and the other circuit to provide an indication for an on-hook condition. Under the above conditions, $$V_1(O) = V_2(O) = \frac{R_2}{R_1 + R_2}V_h.$$

This results in the differential amplifier 5 providing an output voltage $V_T = O$, which results in a binary "1" output from each of the photo transistors T01 and T02.

B. Off-hook state

The hook switch 1 for the subscriber is closed and the line resistance instantly changes to the off-hook resistance by placing resistor $R_f$ in parallel with $R_p$. The current in the line then changes as a function of time depending on the inductance $L_B$ of feeding bridge 3 and the effective series resistance. A voltage $V_s$ as a function of time is developed at the input of the detector in accordance with the design formula $V_s(t)$. Since capacitor $C_1$ and capacitor $C_2$ are charged to $$\frac{R_2}{R_1 + R_2}V_h,$$

these capacitors will change their charge as a function of time depending upon resistors $R_1$ and $R_2$ and the associated one of capacitors $C_1$ and $C_2$. Voltage $V_1$ will change slowly according to the design formula $V_1(t)$ while voltage $V_2$ changes rapidly according to the design formula $V_2(t)$. If the time constant of the time constant circuit including capacitor $C_1$ is about 100 times greater than the time constant of the time constant circuit including capacitor $C_2$, a voltage difference as a function of time is developed at the output of differential amplifier 5. Since voltage $V_2$ is charging capacitor $C_2$ faster than voltage $V_1$ is charging capacitor $C_1$, the non-inverting or plus input of differential amplifier 5, which is connected to voltage $V_2$, will be at a higher potential than the inverting or minus input of differential amplifier 5 connected to voltage $V_1$. Since voltage $V_2$ is positive and dominant, the output voltage of the differential amplifier 5 will be positive. The output voltage of amplifier 5 is positive for an on-hook to off-hook change of state and hence, will be applied between the base and emitter of npn transistor $T_1$. The voltage applied between the base and emitter of transistor $T_1$ is in accordance with design formula $V_{T1}(t)$. When the voltage $V_{T1}$ is greater than the voltage between the base and emitter, $V_{BE}$, of transistor $T_1$, this transistor turns on allowing current $I_{D01}$ to flow from the positive terminal +V to ground through resistor $R_{D1}$ and light emitter diode D01. Current $I_{D01}$ is translated to a proportional amount of light which is coupled through an optical coupled isolator OCI to photo transistor T01 which translates the received light to a current $I_{T01}$. Current $I_{D01}$ is decreased by the current transfer ratio CTR such that $I_{T01} = I_{D01} \times$ CTR. When the current $I_{T01}$ is greater than 1.6 milliamperes transistor T01 turns on and a binary "0" is generated at the collector thereof to indicate an on-off hook state. Resistor $R_{D1}$ is set so that $I_{D01} \times$ CRT is always greater than 1.6 milliamperes when transistor $T_1$ is turned on.

At approximately two times the time constant of the time constant circuit including capacitor $C_1$, $V_1(t) \approx V_2(t)$ and the output voltage of amplifier 5 $V_T = \mathbf{0}$. When these conditions are present, transistor $T_1$ turns off and $I_{D01} = 0$, which turns off photo transistor T01 resulting in the generation of a binary "1" at the collector thereof.

The detector of this invention is now ready to detect an on-hook state when switch hook 1 is opened.

II. Off-Hook To On-Hook State

The detection of this change of state is the same as described above with respect to the change from the on-hook state to the off-hook state except in this case voltage $V_1$ is discharging capacitor $C_1$ slower than voltage $V_2$ is discharging capacitor $C_2$. Thus, the inverting or minus input of the differential amplifier 5 connected to voltage $V_1$ is at a higher potential than the non-inverting or plus input of differential amplifier 5 connected to voltage $V_2$. Since voltage $V_1$ is positive and dominant and is connected to the inverting input of the differential amplifier 5, the output of the differential amplifier 5 will be negative. The output of differential amplifier 5 is now negative so it will be applied between the base and emitter of pnp transistor $T_2$ via diode $D_2$ in accordance with the design formula $V_{T2}(t)$. Transistor T02 is turned on in the same manner as described for transistor T01 and a binary "0" output is generated at the collector of transistor T02 to indicate an on-hook state.

The advantages of the detector of the present invention are as follows: (1) adjusts to changing line resistance, (2) detects only a rapid change in line resistance, (3) will not respond to extremely fast transients, (4) the detector can be made as sensitive as necessary by adjusting the gain of the differential amplifier 5 and (5) the steady state output voltage $V_h$ can be used in an automatic gain control circuit to control the gain of the input and output amplifiers interfacing with the automatic switching system. This would allow longer lines to be used without degradation of signal level.

While I have described above the principles of my invention in connection with specific apparatus it is to be clearly understood that this description is made only by way of example and not as a limitation to the scope of my invention as set forth in the objects thereof and in the accompanying claims.

I claim:

1. A differential on-hook detector for telephone switching systems using common battery signalling comprising:
- a subscriber hook switch;
- a battery having first and second terminals;
- a subscriber line coupled to said battery and said hook switch, said line having a first resistance when said hook switch is in an on-hook state and a second resistance when said hook switch is in an off-hook state;
- a first time constant circuit coupled to said line, said first time constant circuit having a first time constant;
- a second time constant circuit coupled to said line, said second time constant circuit having a second time constant less than said first time constant;
- a differential amplifier having an output, a negative input coupled to said first time constant circuit and a positive input coupled to said second time constant circuit;
- said first and second time constant circuits and said differential amplifier cooperating to produce a positive output voltage when the resistance of said line changes from said first resistance to said second resistance and to produce a negative output voltage when the resistance of said line changes from said second resistance to said first resistance;
- first means coupled to said output of said differential amplifier responsive to said positive output voltage to provide a first output signal when said hook switch changes from said on-hook state to said off-hook state; and
- second means coupled to said output of said differential amplifier responsive to said negative output voltage to provide a second output signal when said hook switch changes from said off-hook state to said on-hook state.

2. A detector according to claim 1, wherein
said first time constant is approximately one hundred times greater than said second time constant.

3. A detector according to claim 1, wherein
said first and second time constant circuits are resistorcapacitor time constant circuits.

4. A detector according to claim 3, wherein
said first time constant is approximately one hundred times greater than said second time constant.

5. A detector according to claim 1, wherein
each of said first and second output signals is a binary "0" condition.

6. A detector according to claim 1, wherein
said first means includes
- a first diode coupled to said output of said differential amplifier,
- a first transistor having its base coupled to said first diode, its emitter coupled to ground potential and its collector coupled to one of said first and second terminals of said battery through a first series circuit including a first resistor and a first light emitting diode,
- a first optical coupler isolator coupled to said first light emitting diode, and
- a first transistor circuit including a first photo transistor coupled to said first isolator to provide a binary "0" condition as said first output signal.

7. A detector according to claim 6, wherein
said second means includes
- a second diode coupled to said output of said differential amplifier,
- a second transistor having its base coupled to said second diode, its emitter coupled to ground potential and its collector coupled to the other of said first and second terminals of said battery through a second series circuit including a second resistor and a second light emitting diode,
- a second optical coupler isolator coupled to said second light emitting diode, and
- a second transistor circuit including a second photo transistor coupled to said second isolator to provide a binary "0" condition as said second output signal.

8. A detector according to claim 7, wherein
said first transistor is an npn transistor, and
said second transistor is a pnp transistor.

9. A detector according to claim 1, wherein
said second means includes
- a diode coupled to said output of said differential amplifier,
- a transistor having its base coupled to said diode, its emitter coupled to ground potential and its collector coupled to one of said first and second terminals of said battery through a series circuit including a resistor and a light emitting diode,
- an optical coupler isolator coupled to said light emitting diode, and
- a transistor circuit including a photo transistor coupled to said isolator to provide a binary "0" condition as said second output signal.

* * * * *